July 19, 1955     H. E. NOVINGER     2,713,465
COMBINED AIR-GROUND VEHICLE
Filed May 21, 1953     6 Sheets-Sheet 1
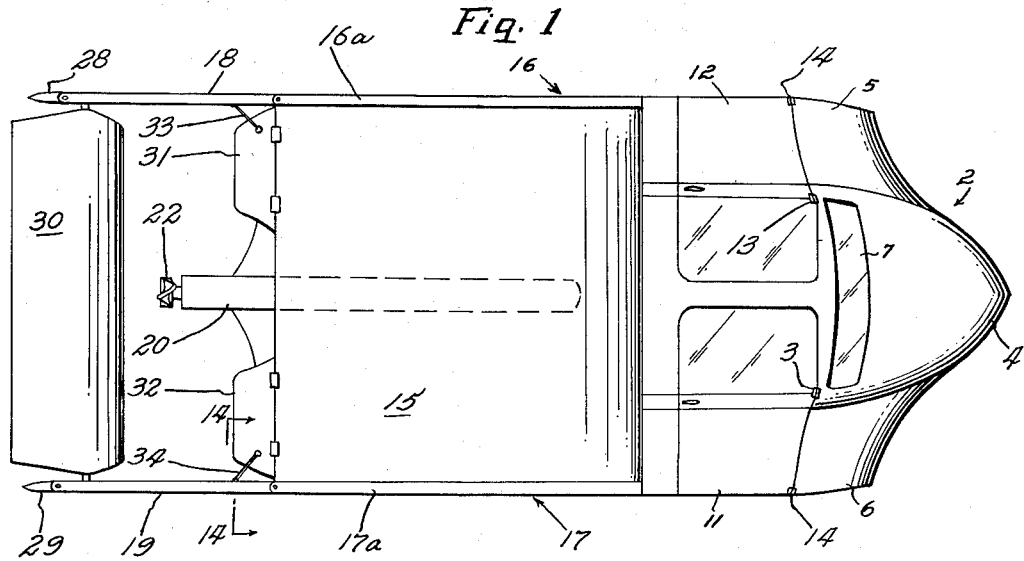
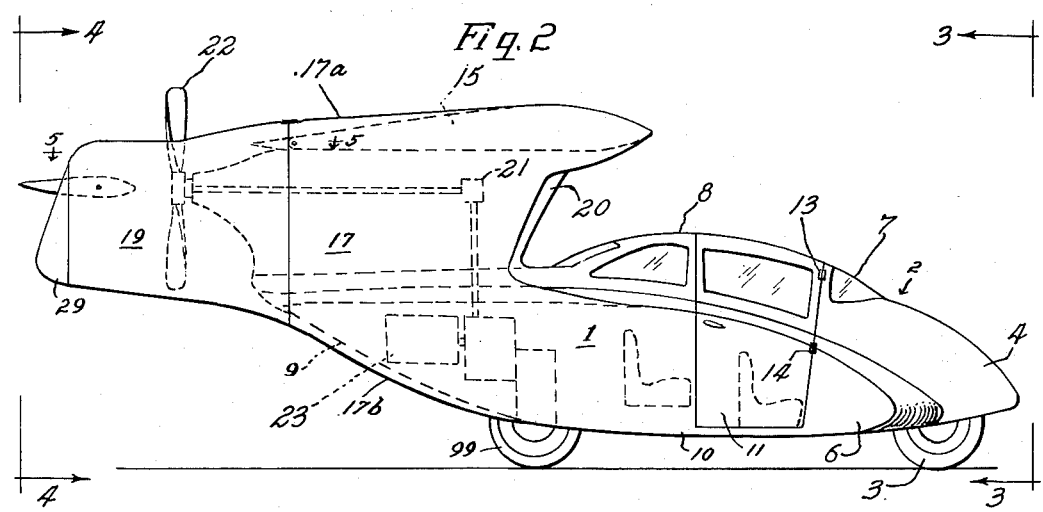
INVENTOR.
Harry E. Novinger
BY GreekWells
Atty.

July 19, 1955  H. E. NOVINGER  2,713,465
COMBINED AIR-GROUND VEHICLE
Filed May 21, 1953  6 Sheets-Sheet 2

INVENTOR.
Harry E. Novinger
BY
Greek Wells
Atty.

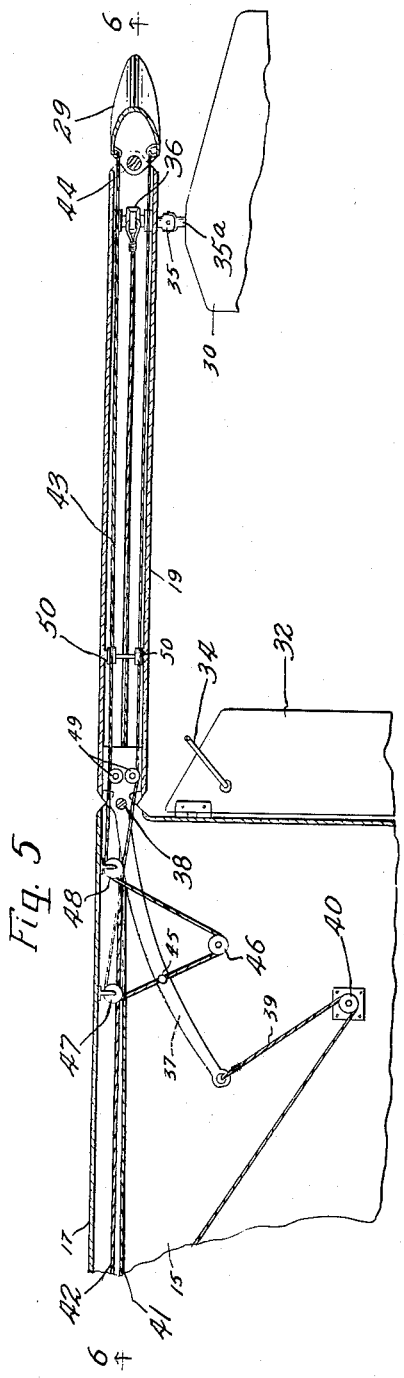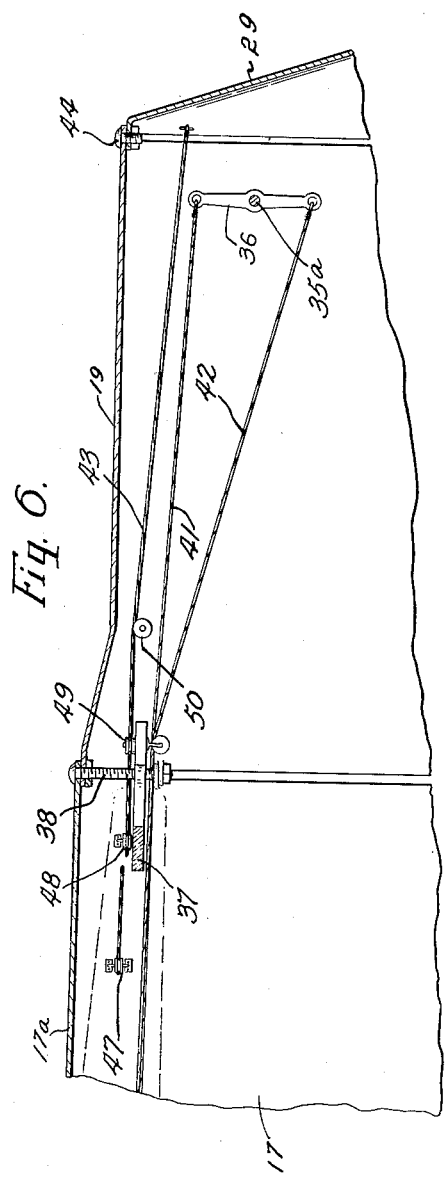

July 19, 1955     H. E. NOVINGER     2,713,465
COMBINED AIR-GROUND VEHICLE

Filed May 21, 1953     6 Sheets-Sheet 4

INVENTOR.
Harry E. Novinger
BY Greek Wells
Atty.

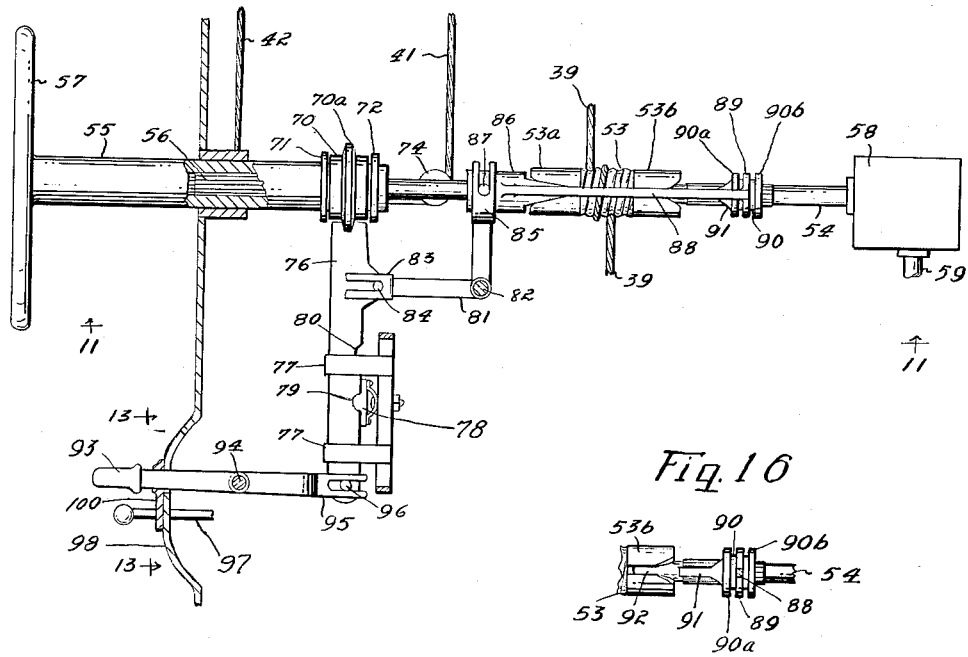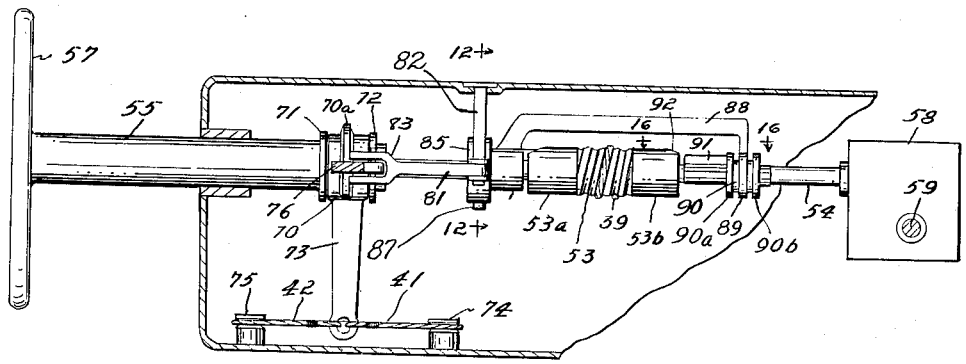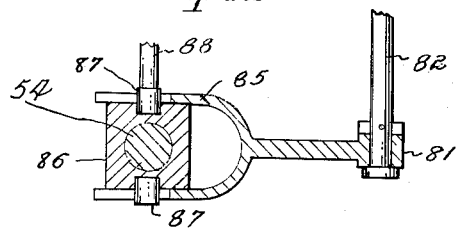

July 19, 1955
H. E. NOVINGER
2,713,465
COMBINED AIR-GROUND VEHICLE
Filed May 21, 1953
6 Sheets-Sheet 6
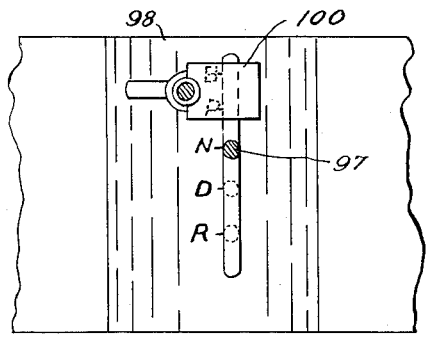
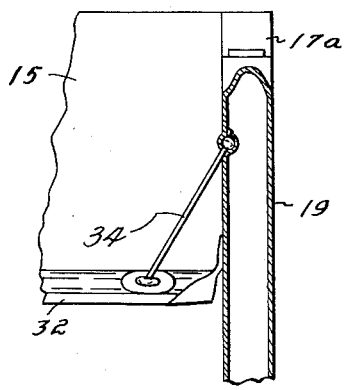
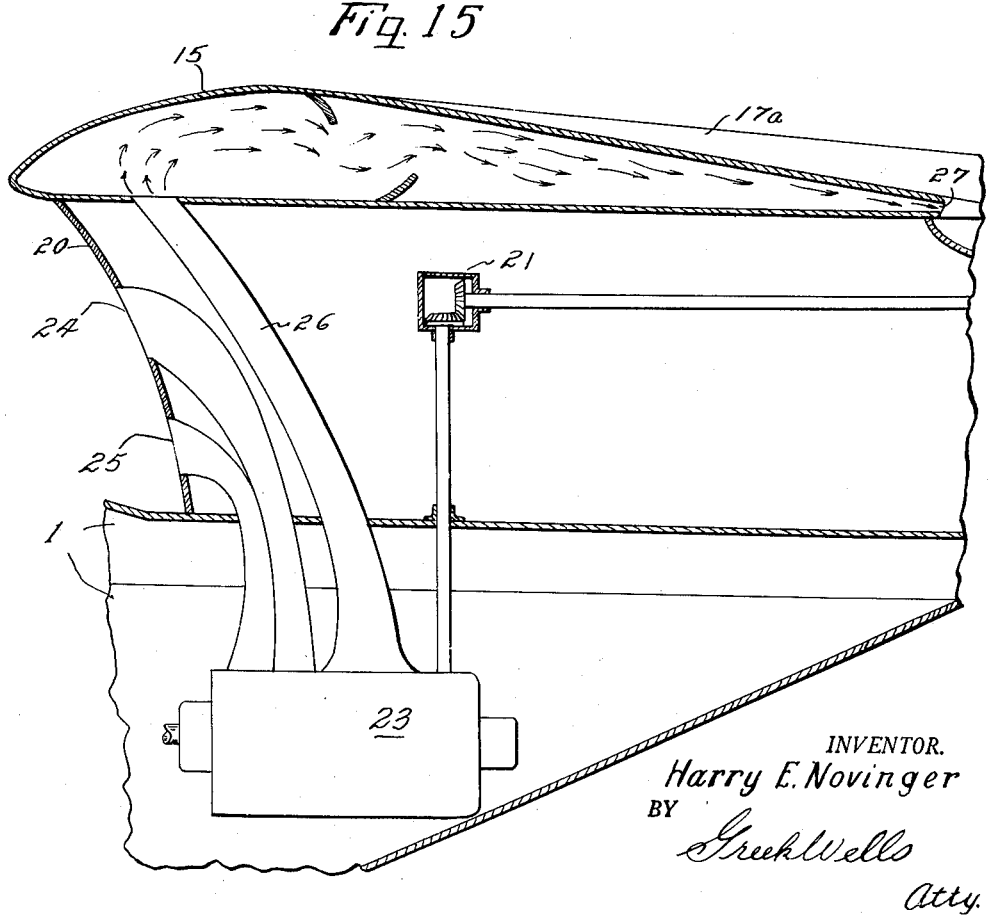
INVENTOR.
Harry E. Novinger
BY
Greek Wells
Atty.

United States Patent Office 2,713,465
Patented July 19, 1955

2,713,465
COMBINED AIR-GROUND VEHICLE
Harry E. Novinger, La Plata, Mo.
Application May 21, 1953, Serial No. 356,528
18 Claims. (Cl. 244—2)

My invention relates to improvement in a combined air-ground vehicle. It is the principal purpose of the invention to provide in such a vehicle a novel combination of wing and fuselage surfaces with plates at the ends of the wings that cooperate with the rudder, the propeller and the wing, and fuselage surfaces to give the vehicle good stability in the air and on the ground without the necessity of removing or adding any parts at transition between air and ground support. My invention contemplates a vehicle of this character having adequate controls of the ground propulsion elements and the elements which operate when the vehicle is air borne, with suitable lockouts that maintain the vehicle safely in ground travel position when it is desired to travel only on the ground and which permits transfer from ground to air support by a simple manipulation of the controls by the operator.

It is also a purpose of my invention to provide in an autocraft of the type above referred to a combination of a fuselage-airfoil section that functions as a lower wing capable of housing a practical load of passengers, fuel and luggage, an upper wing, with a pair of end plates which cooperate with the wings to make an air channel over the fuselage airfoil section and beneath the upper wing, and which eliminate wing tip vortices.

It is a further purpose of my invention to provide a vehicle of the character described, having top and bottom wing sections fitted with end plates that extend rearwardly with respect to the wing sections to form twin rudders, together with a movable elevator stabilizer carried by the rearwardly extending portions of the rudders, the vehicle having a propeller interposed between the rudders in position to direct air flow rearwardly from the top of the upper wing section and through the channel provided by the wing sections and the end plates.

It is another object of my invention to provide a vehicle of the character described above with a simple single set of controls for the operator to use for all flight and ground operations, including steering of the vehicle on the ground and direction of the vehicle while air borne, together with means whereby the ground engaging wheel which directs the vehicle on the ground is free in the landing of the vehicle to correct itself to accommodate for a drift landing where the direction of travel is at an angle to the longitudinal axis of the vehicle.

The nature and advantages of my invention will appear more fully from the following description and the accompanying drawings. It should be understood however, that the drawings and description are illustrative only and are not intended to limit the invention except insofar as it is limited by the claims.

In the drawings:

Figure 1 is a plan view of a vehicle embodying my invention;

Figure 2 is a view in side elevation of the vehicle;

Figure 5 is an enlarged fragmentary sectional view taken substantially on the line 5—5 of Figure 2;

Figure 6 is a sectional view taken on the line 6—6 of Figure 5;

Figure 10 is a detailed plan view of the control mechanism;

Figure 11 is a view taken on the line 11—11 of Figure 10;

Figure 12 is an enlarged sectional view taken on the line 12—12 of Figure 11;

Figure 13 is a fragmentary sectional view taken on the line 13—13 of Figure 10;

Figure 14 is a fragmentary sectional view taken on the line 14—14 of Figure 1;

Figure 15 is a longitudinal sectional view taken through the upper wing and part of the body illustrating the use of the wing as an exhaust muffler; and Figure 16 is a sectional view taken on the line 16—16 of Figure 11.

Figure 3:
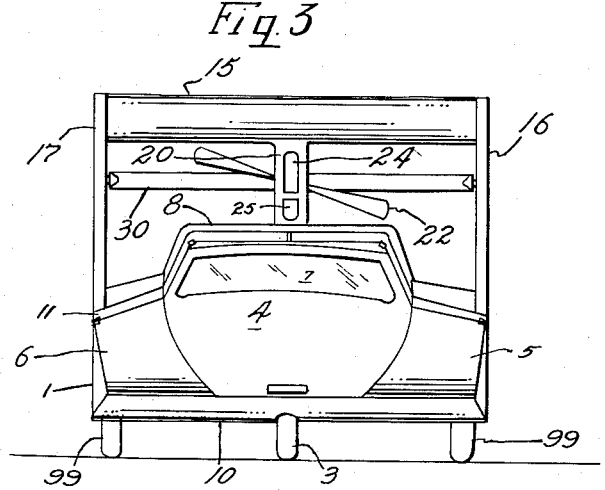
Figure 3 is a front view of the vehicle.
Figure 4:
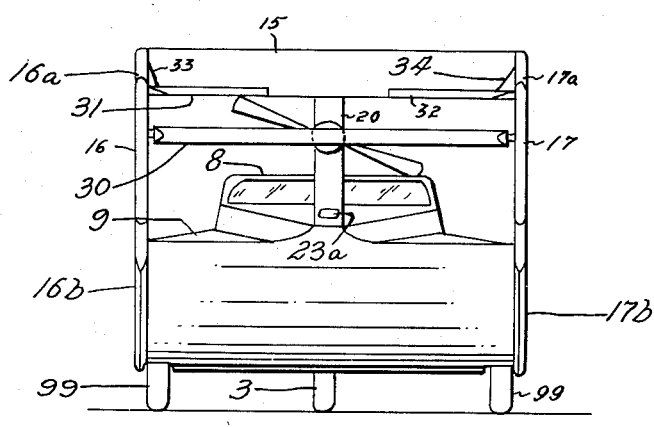
Figure 4 is a rear view of the vehicle.

Referring now to the drawings, the numeral 1 indicates the fuselage-airfoil section that forms the body of the vehicle. The front end 2 of the body is supported by a steering wheel 3 and is formed to provide a central nose portion 4 with two stub wing portions 5 and 6. The portion 4 is curved upwardly to a windshield 7 and to a top section 8 which covers the occupants of the vehicle. Rearwardly of the top section 8, the rear portion of the body 1 is shaped to provide a lower wing 9 which serves as a means to provide part of the lift for flight of the vehicle. The undersurface 10 of the body 1 is substantially straight across and is shaped for good air flow characteristics. For access to the interior of the vehicle I provide two doors 11 and 12 which are hinged at 13 and 14 so as to swing up and out from the body for easy entrance and exit from the body.

An upper wing 15 is provided directly above the lower wing section 9 and the constructions of the wing 15 and the lower wing section 9 are such that the top surfaces of the wing section 9 and the lower surface of the upper wing 15 extend substantially parallel throughout the major portion of their lengths in a direction longitudinally of the vehicle. There are two end plates 16 and 17 which connect the wing 15 with the lower wing section 9 and which extend rearwardly therefrom to provide parallel rudder portions 18 and 19. The end plates 16 and 17 begin substantially at the front end of the upper wing 15 and extend rearwardly to provide, with the cooperating surface of the lower wing section 9 and the upper wing 15, an air channel of substantially uniform cross section throughout the major length of the wing 15 from front to back. The end plates 16 and 17 extend above the upper wing 15 and below the lower wing section 9 to provide ribs 16a, 17a, 16b, and 17b. These ribs act with the end plates 16 and 17 to prevent the wing tip vortices and to thus overcome tip loss in flight.

A central rib 20 connects the top 8 of the body 1 and the lower wing section 9 with the upper wing 15 and extends rearwardly a small distance between the rudders 18 and 19 to provide a mounting for a propeller 22 and for a drive mechanism 21 for supplying power from a vehicle motor 23 to the propeller 22. The rib 20 also provides convenient air intakes 24 and 25 for cooling air to the motor 23 and air for carburetion. The motor exhaust may be through an outlet 23a. However, for quiet operation, I provide means to use the wing 15 as a muffler. Figure 15 shows how the rib 20 is provided with a duct 26 for conducting the exhaust to the wing 15 to muffle the exhaust within the wing and to deliver the exhaust gases out through an opening 27 at the rear edge of the wing 15.

The rudders 18 and 19 are provided with trim tabs 28 and 29 which are controlled by movement of the rudders 18 and 19. An elevator 30 is mounted between the rudders 18 and 19 rearwardly of the propeller 21 for making air borne ascent and descent.

The rear edge of the wing 15 is provided with hinged ailerons 31 and 32 which are connected by torque rods 33 and 34 to the rudders 18 and 19. The torque rods 33 and 34 are swivelled in the rudders 18 and 19 and in the ailerons 31 and 32 and are so positioned that the ailerons will move up and down through a greater angle than the corresponding rudder in response to rudder movement inward or outward. See Figures 1 and 14.

Referring now in particular to Figures 5 and 6, the detailed mechanism by which the rudders 18 and 19 and the elevator 30 are moved will be explained. The elevator 30 is connected by universal joints 35 and stub shafts 35a to control levers 36 within the rudders 18 and 19. In the front end of each rudder a control arm 37 is fixed and this arm extends around the pivot 38 for the rudder into the wing 15. A control cable 39 is fixed to each control arm 37 within the wing 15 and is trained around a guide 40, then to the adjacent end plate 16 or 17 and down through the end plate and forwardly through the body 1 to a control mechanism that is located in the front end 2 of the vehicle. The elevator 30 is controlled at both ends by cables 41 and 42 which extend from the opposite ends of each control lever 36 through the connection of the rudder 18 or 19 to the end plate 17 over suitable guides and then downwardly through the end plate 17 and to the control mechanism in the nose 2.

The trim tabs 28 and 29 are automatically adjusted by movement of the rudders 18 and 19 through a cable 43 for each trim tab 28 or 29 which has its ends connected to the corresponding trim tab on opposite sides of the pivot 44 for the trim tab. The cable 43 extends through the connection of the corresponding rudder to the wing 15 and into the wing where it is connected at 45 to the control arm 37. Suitable guides 46, 47, 48, 49 and 50 guide the cable 43 in the wing 15 and in the rudder 18 or 19. It is evident that when a rudder is moved by its control arm 37, the trim tab on that rudder is turned into the air stream by its cable 43 so as to aid in swinging the rudder.

Figure 7:
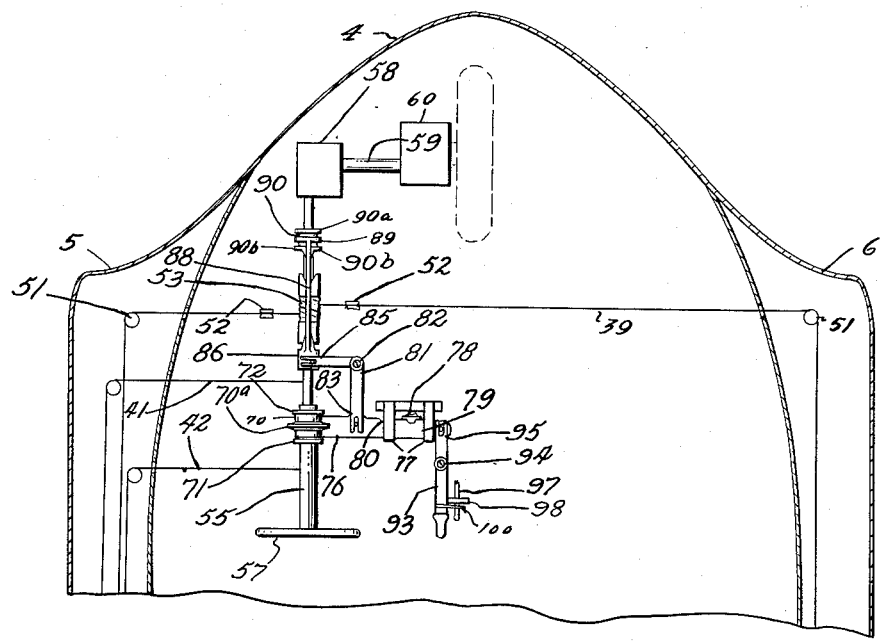
Figure 7 is a somewhat diagrammatic view of the front end of the vehicle showing the cockpit control mechanism in relation to the front end of the fuselage.
Figure 8:
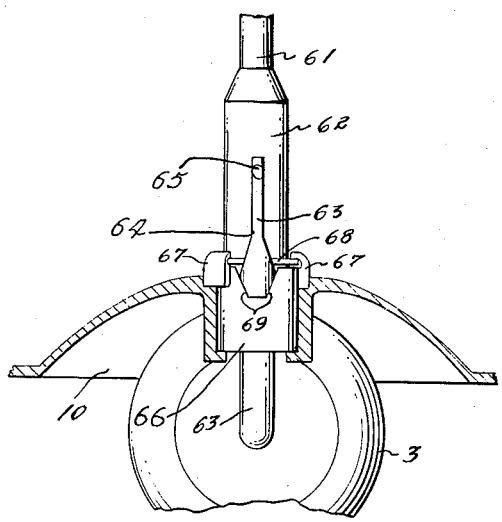
Figure 8 is an enlarged fragmentary side view of the front wheel mounting.
Figure 9:
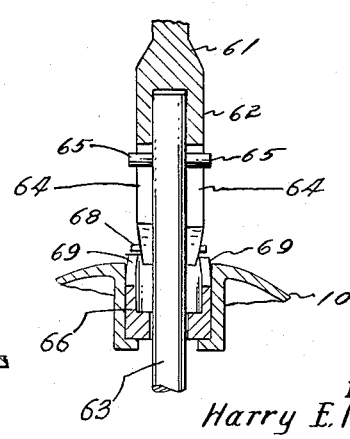
Figure 9 is a detailed sectional view taken vertically through the front wheel mounting on the line 9—9 of Figure 8.

The rudder cable 39 is carried in from the sides of the body 1 at the front 2 of the vehicle around guides 51, and upward over guides 52. It is wrapped around a grooved drum 53. The drum 53 is rotatably but non-slidably mounted on a control shaft 54. The shaft 54 carries a long sleeve 55 which is mounted for sliding movement lengthwise on the shaft 54 but is splined to the shaft 54 by splines 56. A hand wheel 57 is fixed on the sleeve 55. The shaft 54 drives a conventional steering connection 58 to a cross shaft 59 that in turn is connected through a gear box 60 to a vertical shaft 61 which is coupled to the front wheel 3 in the manner illustrated in Figures 7 to 9. The coupling of the front wheel 3 to the shaft 61 is such that in road driving, the wheel 3 is locked to the shaft 61 so it cannot turn with respect to the shaft. In flight however, the wheel 3 may drop a limited amount, and is then held so that the shaft 61 can turn in response to control rotation of the shaft 54 without turning the wheel 3. The wheel 3, when in lowered position, has a limited rotative movement with respect to the body to permit it to align with the direction of travel when it first strikes the ground in landing the vehicle.

The coupling of the wheel 3 to the shaft 61 comprises a tubular portion 62 on the shaft 61 and a stem 63 on which the wheel 3 is carried. The tubular portion 62 has one or more slots 64 extending upward from its lower end. The slots 64 are enlarged at their lower ends as shown. The stem 63 has a lug 65 thereon riding in each slot 64 so that the stem 63 can move up and down in the portion 62 but cannot turn in it, except for a limited amount when the lugs 65 are in the lower portions of the slots 64. A support and guide 66 for the lower end of the portion 62 of the shaft 61 is mounted on the bottom of the vehicle. Flanges 67 and 68 rotatably secure the portion 62 within the support 66. The support 66 has tapered channels 69 to receive the lugs 65 when the stem 63 is in its lowermost position. The channels 69 permit a limited angular movement of the stem 63 with respect to the support 66. The lower end of the portion 62 extends down inside the support 66 so that the enlarged portions of the slots 64 overlap the channels 69.

It is believed to be evident that the coupling of the wheel 3 to the shaft 61 is of such nature as to provide positive steering control of the wheel 3 when it is carrying part of the vehicle load and until it leaves the ground. Also when the vehicle leaves the ground, the wheel 3 drops down and its stem 63 is locked against turning, except for the limited amount permitted by the channels 69. The turning of the shafts 54 and 61, necessary to operate the flight controls, may be done, while flying, free of the load of the wheel 3. The wheel is automatically released from, and brought under full control of, the shaft 61 by the movement of the stem 63 downward and upward in the portion 62.

The hand wheel 57 and the sleeve 55 are moved lengthwise of the shaft 54 to control the elevator 30. The elevator cables 41 and 42 are brought forward to the front end 2 of the vehicle and so connected to the sleeve 55 that a forward movement of the sleeve 55 will pull the cable 42 and turn the elevator to raise its front edge for descent. A rearward movement of the sleeve 55 on the shaft 54 will pull the cable 41 and turn the elevator to lower its front edge for climbing. The means connecting the cables 41 and 42 to the sleeve 55 comprises a ring 70 journalled on the sleeve 55 between two collars 71 and 72 that are fixed on the sleeve 55. The ring 70 carries a depending arm 73 to which the cables 41 and 42 are attached. The cable 41 extends forwardly from the arm 73 around a guide 74, then laterally and along the floor of the body 1 to the end plate 17 and upwardly through the end plate 17 and rearwardly through the rudder 19 to the top end of the elevator control lever 36. Similarly the cable 42 is guided from the arm 73 rearwardly around a guide 75 and then through the body and the rudder 19 to the lower end of the lever 36. By moving the hand wheel 57 toward and away from him, the operator can adjust the elevator 30 at all times while in flight. I provide means, to be described later, that enable the operator, while driving the vehicle on the ground, to lock the ring 70 and the sleeve 55 in a fixed position longitudinally of the shaft 54. This position holds the elevator 30 in position to exert a force tending to hold the nose of the vehicle down while on the ground. This lock mechanism also includes means to hold the drum 53 and the rudders 18 and 19 stationary while the vehicle is being driven on the ground.

The lock mechanism utilizes a sliding lock bar 76 which is slidably mounted on guides 77 within the body. A spring pressed latch 78 is positioned against the bar 76 to engage in one or the other of two recesses 79 and 80 in the bar 76 for road or air borne control. A bell crank 81 is pivoted on a fixed support 82. One end 83 of the bell crank 81 is bifurcated to receive the bar 76 and has its bifurcations slotted to receive a pin 84 that is fixed in the bar 76. The other end 85 of the bell crank 81 is bifurcated to fit over a wedge lock 86 that is slidable and rotatable on the shaft 54. The bifurcations of the end 85 are slotted to receive pins 87 on the wedge lock 86. The wedge lock 86 is adapted to move into and out of a tapered recess in the adjacent end 53a of the drum 53. When the parts are in the position shown in Figure 10, the wedge lock 86 holds the drum 53 stationary. The wedge lock 86 has a bar 88 fixed thereto. The bar 88 extends over the drum 53 to a band 89 that encircles a sleeve 90 between two collars 90a and 90b on the sleeve 90. The sleeve 90 is splined to the shaft 54 to rotate with it. The sleeve 90 carries a key 91 that is adapted to enter a slot 92 in the end 53b of the drum 53. In Figures 10 and 11, the key 91 is clear of the slot 92 so that the sleeve 90 rotates free of the drum 53 for road travel.

When the bar 76 is moved away from the ring 70 until the recess 80 is engaged with the latch 78, a rib 70a on the ring 70 is freed from the bar 76 so the sleeve 55 can move endwise of the shaft 54. Also the bell crank 81 is turned on its support 82 to remove the wedge lock 86 from engagement with the end 53a of the drum 53. The key 91 is moved into the slot 92 to lock the drum 53 to the sleeve 90 so it must turn with the shaft 54. This is the flight position of the control parts just described. The sleeve 55 and the wheel 57 can be moved to actuate the elevator control cables 41 and 42 by moving the ring 70 and its arm 73. By turning the wheel 57, the drum 53 can be rotated to move the rudders 18 and 19 to right or left by means of the cable 39 and the levers 37.

A hand lever 93 is pivoted on a support 94 and is bifurcated at 95 to receive the free end of the lock bar 76. The bifurcated end 95 of the hand lever is slotted to receive a pin 96 that is fixed in the bar 76. By moving the hand lever 93 toward the wheel 57, the operator actuates the controls from road position to flight position. Located adjacent to the hand lever are a power control lever 97 and an indicating panel 98. (See Figures 11 and 13.) The power control lever, in its lowermost position, is adapted to connect the motor 23 to the rear wheels 99 of the vehicle to move the vehicle backward. The next lower position of the lever 97 is the position for connecting the motor 23 to the rear wheels 99 for forward travel or drive. The next upward position of the lever 97, the position shown in Figure 13, is neutral, where the motor 23 is disconnected from the wheels 99 and from the propeller 22. In its next upward position, the lever 97 indicates that the motor 23 is connected to the propeller 22 only and the uppermost position of the lever 97 indicates that the motor is connected to both the wheels 99 and to the propeller for taking off from the ground. This gives the operator forward drive from the wheels and the propeller. The lever 93 carries a shield 100 that is adapted to block movement of the lever 97 into either of the two upper positions until the lock bar 76 is moved to release the sleeve 55 for endwise movement and the drum 53 for rotation. This is a safety feature to prevent the operation of the propeller except when flight is intended and the flight controls are freed for operation.

The particular gearing and controls for connecting the motor 23 to the propeller 22 and the wheels 99 are not shown since these devices may be of any conventional design. The novel features of the present invention are not dependent upon any particular mechanism for applying the power to the propeller and the wheels.

It is believed that the foregoing detailed description shows that I have provided a combined air and ground travel vehicle, of unique design, which combines on a wheeled body, top and bottom wings together with end plates across the ends of the wings that extend rearwardly therefrom to provide rudders. The plates also extend above and below the wing surfaces to oppose losses in lift due to wing tip vortex. This design in combination with the control mechanism, provides a machine which enables the operator to shift smoothly from ground to air directional control with a transition step where both ground and air control are available during take-off and landing. The steering control is automatically available whenever the wheel 3 carries enough weight to force its stem 63 up into the portion 62 far enough to engage the lugs 65 with the narrow portion of the slots 64.

The end plates and the adjacent lower surface of the upper wing and upper surface of the lower wing provide a channel through which the air is directed and accelerated by the propeller. The channel in flight acts in a novel fashion to utilize the lower surface of the upper wing in deflecting the air stream and to develop low pressure over the upper surface of the lower wing. The lift due to the low pressure over the lower wing is not reduced by wing tip vortex because the end plates prevent any such loss. The ribs 16a and 17a help to avoid wing tip losses on the top of the upper wing. The peculiar combination of parts just described is effective to obtain the necessary lift in an air-ground vehicle of such width and height as to enable the vehicle to travel on the present day highways. The vehicle can lift and fly with a normal load and land again at a speed well within driving speeds now permitted on highways.

It is believed that the nature and advantages of my invention have been sufficiently explained hereinbefore, to enable others to understand and practice the invention.

Having thus described my invention, I claim:

1. A machine adapted for air and ground travel comprising a main body adapted to house power means and controls and seating accommodations for the operator, wheels supporting the body and comprising rear drive wheels and a front steering wheel, the body having its surface formed to provide a lower wing, an upper wing spaced above said lower wing, end plates at the sides of said body extending across the ends of said wings beginning substantially at the front of the upper wing and extending rearwardly to the rear edge of the upper wing to provide, with the cooperating top surface of the lower wing and the lower surface of the upper wing, an air channel beneath the upper wing and over the rear portion of the lower wing, and an air propeller supported by said body at the rear ends of said wings positioned to draw air rearwardly from said channel and from the space immediately above the upper wing.

2. A machine adapted for air and ground travel comprising a main body adapted to house power means and controls and seating accommodations for the operator, wheels supporting the body and comprising rear drive wheels and a front steering wheel, the body having its surface formed to provide a lower wing, an upper wing spaced above said lower wing, end plates at the sides of said body extending across the ends of said wings beginning substantially at the front of the upper wing and extending rearwardly to the rear edge of the upper wing to provide, with the cooperating top surface of the lower wing and the lower surface of the upper wing, an air channel beneath the upper wing and over the rear portion of the lower wing, said end plates having air deflecting ribs projecting above the trailing upper surface of the upper wing, and an air propeller supported by said body at the rear ends of said wings positioned to draw air rearwardly from said channel and from the space immediately above the upper wing.

3. A machine adapted for air and ground travel comprising a main body adapted to house power means and controls and seating accommodations for the operator, wheels supporting the body and comprising rear drive wheels and a front steering wheel, the body having its surface formed to provide a lower wing, an upper wing spaced above said lower wing, end plates at the sides of said body extending across the ends of said wings beginning substantially at the front of the upper wing and extending rearwardly to the rear edge of the upper wing to provide, with the cooperating top surface of the lower wing and the lower surface of the upper wing, an air channel beneath the upper wing and over the rear portion of the lower wing, the end plates having air deflecting ribs extending below the rear lower surface of the lower wing, and an air propeller supported by said body at the rear ends of said wings positioned to draw air rearwardly from said channel and from the space immediately above the upper wing.

4. A machine adapted for air and ground travel comprising a main body adapted to house power means and controls and seating accommodations for the operator, wheels supporting the body and comprising rear drive wheels and a front steering wheel, the body having its surface formed to provide a lower wing, an upper wing spaced above said lower wing, end plates at the sides of said body extending across the ends of said wings beginning substantially at the front of the upper wing and extending rearwardly to the rear edge of the upper wing to provide, with the cooperating top surface of the lower wing and the lower surface of the upper wing, an air channel beneath the upper wing and over the rear portion of the lower wing, and an air propeller supported by said body at the rear ends of said wings positioned to draw air rearwardly from said channel and from the space immediately above the upper wing, said end plates having rudder portions hinged to the rear ends thereof and forming laterally swingable extensions thereof.

5. A machine adapted for air and ground travel comprising a main body adapted to house power means and controls and seating accommodations for the operator, wheels supporting the body and comprising rear drive wheels and a front steering wheel, the body having its surface formed to provide a lower wing, an upper wing spaced above said lower wing, end plates at the sides of said body extending across the ends of said wings beginning substantially at the front of the upper wing and extending rearwardly to the rear edge of the upper wing to provide, with the cooperating top surface of the lower wing and the lower surface of the upper wing, an air channel beneath the upper wing and over the rear portion of the lower wing, said end plates having air deflecting ribs at their top edges projecting above the trailing upper surface of the upper wing, said end plates also having air deflecting ribs at their lower edges projecting below the rear lower surface of the lower wing, and an air propeller supported by said body at the rear ends of said wings positioned to draw air rearwardly from said channel and from the space immediately above the upper wing, said end plates having rudder portions hinged to the rear ends thereof and forming laterally swingable extensions thereof.

6. A machine adapted for air and ground travel comprising a main body adapted to house power means and controls and seating accommodations for the operator, wheels supporting the body and comprising rear drive wheels and a front steering wheel, the body having its surface formed to provide a lower wing, an upper wing spaced above said lower wing, end plates at the sides of said body and connecting the wings to form a channel beneath the upper wing and over the rear portion of the lower wing, an air propeller supported by said body at the rear ends of said wings positioned to draw air rearwardly from said channel and from the space immediately above the upper wing, said end plates having rudder portions hinged to the rear ends thereof and forming laterally swingable extensions thereof, an elevator between the rudders rearwardly of the propeller, the elevator having universal joints at both ends, and a control shaft mounted in one rudder and connected to the elevator by the adjacent universal joint.

7. A machine adapted for air and ground travel comprising a main body adapted to house power means and controls and seating accommodations for the operator, wheels supporting the body and comprising rear drive wheels and a front steering wheel, the body having its surface formed to provide a lower wing, an upper wing spaced above said lower wing, end plates at the sides of said body and connecting the wings to form a channel beneath the upper wing and over the rear portion of the lower wing, an air propeller supported by said body at the rear ends of said wings positioned to draw air rearwardly from said channel and from the space immediately above the upper wing, said end plates having rudder portions hinged to the rear ends thereof and forming laterally swingable extensions thereof, an elevator between the rudders rearwardly of the propeller, the elevator having universal joints at both ends, a control shaft mounted in one rudder and connected to the elevator by the adjacent universal joint, a steering mechanism for said front wheel, rudder moving means, elevator moving means, and manually operable means for connecting said rudder moving means to the steering mechanism and disconnecting the same.

8. A machine adapted for air and ground travel comprising a main body adapted to house power means and controls and seating accommodations for the operator, wheels supporting the body and comprising rear drive wheels and a front steering wheel, the body having its surface formed to provide a lower wing, an upper wing spaced above said lower wing, end plates at the sides of said body and connecting the wings to form a channel beneath the upper wing and over the rear portion of the lower wing, an air propeller supported by said body at the rear ends of said wings positioned to draw air rearwardly from said channel and from the space immediately above the upper wing, said end plates having rudder portions hinged to the rear ends thereof and forming laterally swingable extensions thereof, an elevator between the rudders rearwardly of the propeller, the elevator having universal joints at both ends, a control shaft mounted in one rudder and connected to the elevator by the adjacent universal joint, a steering mechanism for said front wheel and means supporting the front wheel for vertical movement in the body, means operable automatically to connect the front wheel for operation by the steering mechanism when the front wheel is supporting part of the body load, and to release the front wheel from the steering mechanism when the front wheel is free of load.

9. A machine adapted for air and ground travel comprising a main body adapted to house power means and controls and seating accommodations for the operator, wheels supporting the body and comprising rear drive wheels and a front steering wheel, the body having its surface formed to provide a lower wing, an upper wing spaced above said lower wing, end plates at the sides of said body and connecting the wings to form a channel beneath the upper wing and over the rear portion of the lower wing, an air propeller supported by said body at the rear ends of said wings positioned to draw air rearwardly from said channel and from the space immediately above the upper wing, said end plates having rudder portions hinged to the rear ends thereof and forming laterally swingable extensions thereof, an elevator between the rudders rearwardly of the propeller, the elevator having universal joints at both ends, a control shaft mounted in one rudder and connected to the elevator by the adjacent universal joint, a steering mechanism for said front wheel and means supporting the front wheel for vertical movement in the body, means operable automatically to connect the front wheel for operation by the steering mechanism when the front wheel is supporting part of the body load, and to release the front wheel from the steering mechanism when the front wheel is free of load, the supporting means including a lost motion connection between the body and the wheel, operable to limit the angular movement of the wheel with respect to the body when the wheel is free of load.

10. A machine adapted for air and ground travel comprising a main body adapted to house power means and controls and seating accommodations for the operator, wheels supporting the body and comprising rear drive wheels and a front steering wheel, the body having its surface formed to provide a lower wing, an upper wing spaced above said lower wing, end plates at the sides of said body extending across the ends of said wings beginning substantially at the front of the upper wing and extending rearwardly to the rear edge of the upper wing to provide, with the cooperating top surface of the lower wing and the lower surface of the upper wing, an air channel beneath the upper wing and over the rear portion of the lower wing, a hollow rib in said channel midway between said end plates extending from the lower wing upward to the upper wing and extending rearwardly beyond the wings, a propeller drive shaft in said rib, an air propeller on said shaft at the rear end of said rib positioned to draw air through said channel and from the space immediately above the upper wing.

11. A machine adapted for air and ground travel comprising a main body adapted to house power means and controls and seating accommodations for the operator, wheels supporting the body and comprising rear drive wheels and a front steering wheel, the body having its surface formed to provide a lower wing, an upper wing spaced above said lower wing, end plates at the sides of said body and connecting the wings to form a channel beneath the upper wing and over the rear portion of the lower wing, a hollow rib connecting the body and lower wing to the upper wing and extending rearwardly beyond the wings, said rib having an engine exhaust duct therein opening into the upper wing, the upper wing having a rear discharge opening for exhaust gases, and a propeller carried by the rear end of said hollow rib and positioned to draw air rearwardly through said channel and from the space immediately above the upper wing.

12. A machine adapted for air and ground travel comprising a main body adapted to house power means and controls and seating accommodations for the operator, wheels supporting the body and comprising rear drive wheels and a front steering wheel, the body having its surface formed to provide a lower wing, an upper wing spaced above said lower wing, end plates at the sides of said body and connecting the wings to form a channel beneath the upper wing and over the rear portions of the lower wing, said end plates having air deflecting ribs at their top edges projecting above the trailing upper surface of the upper wing, said end plates also having air deflecting ribs at their lower edges projecting below the rear lower surface of the lower wing, a central rib connecting said wings, and an air propeller carried by said rib at the rear ends of said wings positioned to draw air rearwardly from said channel and from the space immediately above the upper wing, said end plates having rudder portions hinged to the rear ends thereof and forming laterally swingable extensions thereof.

13. A machine adapted for air and ground travel comprising a main body adapted to house power means and controls and seating accommodations for the operator, wheels supporting the body and comprising rear drive wheels and a front steering wheel, the body having its surface formed to provide a lower wing, an upper wing spaced above said lower wing, end plates at the sides of said body and connecting the wings to form a channel beneath the upper wing and over the rear portion of the lower wing, a central rib connecting said wings, an air propeller carried by said rib at the rear ends of said wings positioned to draw air rearwardly from said channel and from the space immediately above the upper wing, said end plates having rudder portions hinged to the rear ends thereof and forming laterally swingable extensions thereof, an elevator between the rudders rearwardly of the propeller, the elevator having universal joints at both ends, and a control shaft mounted in one rudder and connected to the elevator by the adjacent universal joint.

14. In an air craft having lower wing and upper wing spaced above the lower wing, end plates extending from the lower wing up to the upper wing and forming with said wings an air channel, an air propeller supported by said body at the rear ends of said wings positioned to draw air rearwardly from said channel, said end plates having rudder portions hinged to the rear ends thereof and forming laterally swingable extensions thereof, an elevator between the rudders and carried by the rudders rearwardly of the propeller, the elevator having universal joints at both ends, and a control shaft for the elevator mounted in one rudder and connected to the elevator by the adjacent universal joint.

15. In a machine adapted for air and ground travel having a body adapted to house power means and controls and seating accommodation for the operator, and having wheels for supporting the body including a steering wheel, said body having wing means thereon and an elevator and a rudder on said wing means, a steering mechanism for said steering wheel, said steering mechanism comprising a manually slidable and rotatable stem to which said rudder is releasably connected for shifting the rudder by turning of the stem, and to which the elevator is connected for shifting the elevator by sliding the stem, and means manually operable to release the rudder from said stem and lock the stem against sliding.

16. In a machine adapted for air and ground travel having a body adapted to house power means and controls and seating accommodation for the operator, and having wheels for supporting the body including a steering wheel, said body having wing means thereon and an elevator and a rudder on said wing means, a steering mechanism for said steering wheel, said steering mechanism comprising a manually slidable and rotatable stem to which said rudder is releasably connected for shifting the rudder by turning of the stem, and to which the elevator is connected for shifting the elevator by sliding the stem, means operable automatically to connect the steering wheel for operation by the steering mechanism when said wheel is supporting part of the body load, and to release the steering wheel from the steering mechanism when said wheel is free of load, and means manually operable to release the rudder from said stem and lock the stem against sliding.

17. In an air craft having a lower wing and an upper wing spaced above the lower wing, end plates extending from the lower wing up to the upper wing and forming with said wings an air channel, an air propeller supported by said body at the rear ends of said wings positioned to draw air rearwardly from said channel, said end plates having rudder portions hinged to the rear ends thereof and forming laterally swingable extensions thereof, manual control means in the body connected to said rudder portions for angularly adjusting them, an aileron hinged to the rear edge of said upper wing adjacent to each rudder portion for up and down swinging movement, and a rod universally connected to each aileron and to the adjacent rudder portion, operable to swing the aileron vertically as the rudder portion moves laterally about its hinge.

18. In an air craft having a lower winglike body and a hollow upper wing spaced above the body, a hollow rib connecting the body to the upper wing and extending rearwardly beyond the wing and body, said rib having an exhaust duct leading from the body into the upper wing to discharge exhaust gases into the interior of the upper wing, said upper wing having a rear discharge opening for the exhaust gases.

References Cited in the file of this patent

UNITED STATES PATENTS

| | | |
|---|---|---|
| 1,893,129 | Charpentier | Jan. 3, 1933 |
| 1,968,497 | Magalis | July 31, 1934 |
| 1,980,246 | Austin | Nov. 13, 1934 |
| 2,472,763 | Rodeck | June 7, 1949 |
| 2,494,547 | Fish | Jan. 17, 1950 |

FOREIGN PATENTS

| | | |
|---|---|---|
| 66,191 | Netherlands | Aug. 15, 1950 |
| 420,899 | Italy | May 9, 1947 |